(12) United States Patent
Galvan et al.

(10) Patent No.: US 10,661,540 B2
(45) Date of Patent: May 26, 2020

(54) FILM FOR STRETCH HOOD APPLICATIONS

(71) Applicant: BASELL POLIOLEFINE ITALIA S.R.L., Milan (IT)

(72) Inventors: Monica Galvan, Ferrara (IT); Gianni Perdomi, Ferrara (IT); Claudio Cavalieri, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 47 days.

(21) Appl. No.: 16/301,799

(22) PCT Filed: May 9, 2017

(86) PCT No.: PCT/EP2017/060983
§ 371 (c)(1),
(2) Date: Nov. 15, 2018

(87) PCT Pub. No.: WO2017/202597
PCT Pub. Date: Nov. 30, 2017

(65) Prior Publication Data
US 2019/0160795 A1 May 30, 2019

(30) Foreign Application Priority Data

May 25, 2016 (EP) .................................... 16171219

(51) Int. Cl.
| | | |
|---|---|---|
| B32B 27/08 | (2006.01) | |
| B32B 27/30 | (2006.01) | |
| B32B 27/32 | (2006.01) | |
| B65B 9/13 | (2006.01) | |

(52) U.S. Cl.
CPC ............ B32B 27/08 (2013.01); B32B 27/306 (2013.01); B32B 27/308 (2013.01); B32B 27/32 (2013.01); B32B 2250/246 (2013.01); B32B 2250/40 (2013.01); B32B 2270/00 (2013.01); B32B 2307/51 (2013.01); B32B 2553/00 (2013.01); B65B 9/135 (2013.01)

(58) Field of Classification Search
CPC ...... C08L 23/08; C08L 23/10; C08L 2205/02; C08L 2205/03; C08L 2203/16
See application file for complete search history.

(56) References Cited

U.S. PATENT DOCUMENTS

| | | | |
|---|---|---|---|
| 5,453,466 A | 9/1995 | Pellegatti et al. | |
| 7,125,924 B2 | 10/2006 | Credali et al. | |
| 7,981,982 B2 * | 7/2011 | Cagnani | C08F 210/16 526/64 |
| 10,501,616 B2 * | 12/2019 | Galvan | C08L 23/10 |
| 2004/0041299 A1 * | 3/2004 | Kim | C08J 5/18 264/176.1 |
| 2006/0223942 A1 | 10/2006 | Perdomi | |
| 2010/0203309 A1 | 8/2010 | Ellingson | |
| 2011/0041460 A1 | 2/2011 | Weisinger et al. | |
| 2015/0166778 A1 * | 6/2015 | Fantinel | C08L 23/0815 428/36.9 |
| 2015/0232643 A1 * | 8/2015 | Herklots | B29C 43/00 264/523 |
| 2016/0347941 A1 * | 12/2016 | Nakajima | C08K 5/0083 |
| 2019/0284383 A1 * | 9/2019 | Galvan | C08L 23/16 |

FOREIGN PATENT DOCUMENTS

| | | | |
|---|---|---|---|
| CN | 1085995 A | 4/1994 | |
| CN | 1646623 A | 7/2005 | |
| CN | 1795235 A | 6/2006 | |
| CN | 101522782 A | 9/2009 | |
| EP | 2540499 A1 * | 1/2013 | ............ B32B 27/34 |
| WO | WO-2006062956 A2 * | 6/2006 | ............ C08F 10/00 |
| WO | 2007044544 A2 | 4/2007 | |

OTHER PUBLICATIONS

PCT International Search Report and Written Opinion dated Jul. 7, 2017 (Jul. 7, 2017) for Corresponding PCT/EP2017/060983.

* cited by examiner

*Primary Examiner* — Michael M Dollinger

(57) ABSTRACT

The disclosure provides a multilayer blown film for stretch hood made from or containing a layer made from or containing a first polyolefin composition made from or containing from 20 wt % to 80 wt %, based upon the total weight of the first polyolefin composition, of Component A) and from 20 wt % to 80 wt %, based upon the total weight of the first polyolefin composition, of Component B);

wherein Component A) is an ethylene copolymer and Component B) is a polyolefin composition made from or containing:

(i) 5-35% by weight, based upon the total weight of Component B, of a propylene homopolymer or a propylene ethylene copolymer (ii) 20-50% by weight, based upon the total weight of Component B, of a copolymer of ethylene and a $C_3$-$C_8$ alpha-olefin; and (iii) 30-60% by weight, based upon the total weight of Component B, of a copolymer of ethylene and propylene.

15 Claims, No Drawings

FILM FOR STRETCH HOOD APPLICATIONS

This application is the U.S. National Phase of PCT International Application PCT/EP2017/060983, filed May 9, 2017, claiming benefit of priority to European Patent Application No. 16171219.5, filed May 25, 2016, the contents of which are incorporated herein by reference in its entirety.

FIELD OF THE INVENTION

In general, the present disclosure relates to the field of chemistry. More specifically, the present disclosure relates to polymer chemistry. In particular, the present disclosure relates to multilayer film for stretch hood application wherein at least one layer is made from or contains a polyolefin composition.

BACKGROUND OF THE INVENTION

In some instances, polyolefin film formulations used in industrial stretch hood packaging applications provide a compromise between elastic recovery during packaging and load stability during storage and transportation.

In some instances, industrial stretch hood packaging film structures are based on ethylene vinyl acetate copolymers (LDPE-EVA) rich film formulations, that is, formulations having more than 50 weight percent (wt %) is LDPE-EVA. In some instances, film design involves a 3-layer co-extruded structure based on an EVA core layer and skin layers based on metallocene-catalyzed linear low density polyethylene (mLLDPE) rich blends. In some instances, the EVA-core layer is made from or contains an EVA with a content of units derived from vinyl acetate (VA) of 7.5 to 18 wt %.

SUMMARY OF THE INVENTION

The present disclosure provides a multilayer blown film for stretch hood made from or containing a layer made from or containing a first polyolefin composition made from or containing from 20 wt % to 80 wt %, based upon the total weight of the first polyolefin composition, of Component A) and from 20 wt % to 80 wt %, based upon the total weight of the first polyolefin composition, of Component B), wherein the amounts of A) and B) being referred to the total weight of A)+B) and the sum of the amount of A) and B) being 100; and wherein Component A) is an ethylene copolymer made from or containing a recurring unit derived from an ester selected from:

(1) ethylenically unsaturated organic monomer of esters of unsaturated $C_3$-$C_{20}$ monocarboxylic acids and $C_1$ to $C_{24}$ monovalent aliphatic or alicyclic alcohols, and (2) vinyl esters of saturated $C_2$-$C_{18}$ carboxylic acids;

the ethylene copolymer having a density ranging from 0.920 to 0.935 g/mL; and an MFR (190° C./2.16 kg) ranging from 0.10 to 20.00 g/10 min; and Component B) is a second polyolefin composition made from or containing (i) 5-35% by weight, based upon the total weight of Component B, of a propylene homopolymer containing 5% by weight or less of a fraction soluble in xylene at 25° C. ($XS_i$), or a propylene ethylene copolymer containing 90% by weight or more of propylene units; containing 10% by weight or less of a fraction soluble in xylene at 25° C. ($XS_i$), both the amount of propylene units and of the fraction $XS_i$ being referred to the weight of (i);

(ii) 20-50% by weight, based upon the total weight of Component B, of a copolymer of ethylene and a $C_3$-$C_8$ alpha-olefin containing from 0.1% to 20% by weight of alpha-olefin units and containing 25% by weight or less; of a fraction soluble in xylene at 25° C. ($XS_{ii}$), both the amount of alpha-olefin units and of the fraction $XS_{ii}$ being referred to the weight of (ii); and (iii) 30-60% by weight, based upon the total weight of Component B, of a copolymer of ethylene and propylene containing from 25% to 75% by weight; of ethylene units and containing from 40% to 95% by weight of a fraction soluble in xylene at 25° C. ($XS_{iii}$), both the amount of ethylene units and of the fraction $XS_{iii}$ being referred to the weight of (iii), wherein the amounts of (i), (ii) and (iii) being referred to the total weight of (i)+(ii)+(iii) and the sum of the amount of (i), (ii) and (iii) being 100.

DETAILED DESCRIPTION OF THE INVENTION

In some embodiments, the present disclosure provides a multilayer blown film for stretch hood made from or containing a layer made from or containing a first polyolefin composition made from or containing from 20 wt % to 80 wt %, based upon the total weight of the first polyolefin composition, alternatively from 30 wt % to 70 wt %, alternatively from 40 wt % to 60 wt % of Component A) and from 20 wt % to 80 wt %, based upon the total weight of the first polyolefin composition, alternatively from 30 wt % to 70 wt %, alternatively from 40 wt % to 60 wt % of Component B)

wherein the amounts of A) and B) being referred to the total weight of A)+B) and the sum of the amount of A) and B) being 100;

wherein Component A) is an ethylene copolymer made from or containing a recurring unit derived from an ester selected from:

(1) ethylenically unsaturated organic monomer of esters of unsaturated $C_3$-$C_{20}$ monocarboxylic acids and $C_1$ to $C_{24}$ monovalent aliphatic or alicyclic alcohols, and (2) vinyl esters of saturated $C_2$-$C_{18}$ carboxylic acids;

the ethylene copolymer having a density ranging from 0.920 to 0.935 g/mL; and an MFR (190° C./2.16 kg) ranging from 0.10 to 20.00 g/10 min; alternatively from 0.15 to 10.00 g/10 min; alternatively from 0.20 to 5.00 g/10 min; and Component B) is a second polyolefin composition made from or containing (i) 5-35% by weight, based upon the total weight of Component B, alternatively 10-30% by weight; alternatively 15-23% by weight of a propylene homopolymer containing 5% by weight or less of a fraction soluble in xylene at 25° C. ($XS_i$), or a propylene ethylene copolymer containing 90% by weight or more, alternatively 95% by weight or more; alternatively 97% by weight or more of propylene units; containing 10% by weight or less of a fraction soluble in xylene at 25° C. ($XS_i$), both the amount of propylene units and of the fraction $XS_i$ being referred to the weight of (i);

(ii) 20-50% by weight, based upon the total weight of Component B, alternatively 25-45% by weight; alternatively 30-40% by weight copolymer of ethylene and a $C_3$-$C_8$ alpha-olefin containing from 0.1% to 20% by weight; alternatively from 5% to 15% by weight; alternatively from 7% to 12% by weight of alpha-olefin units and containing 25% by weight or less; alternatively from 20% by weight or less;

alternatively 17% by weight or less of a fraction soluble in xylene at 25° C. ($XS_{ii}$), both the amount of alpha-olefin units and of the fraction $XS_{ii}$ being referred to the weight of (ii); and (iii) 30-60% by weight, based upon the total weight of Component B, alternatively 35-55% by weight; alternatively 40-50% by weight of a copolymer of ethylene and propylene containing from 25% to 75% by weight; alternatively from 37% to 65% by weight; alternatively from 45% to 58% by weight of ethylene units and containing from 40% to 95% by weight of a fraction soluble in xylene at 25° C. ($XS_{iii}$), both the amount of ethylene units and of the fraction $XS_{iii}$ being referred to the weight of (iii);

wherein the amounts of (i), (ii) and (iii) being referred to the total weight of (i)+(ii)+(iii) and the sum of the amount of (i), (ii) and (iii) being 100.

In some embodiments, Component A has the comonomers to be copolymerized with ethylene monomer selected from the group consisting of unsaturated carboxylic acid esters. In some embodiments, the unsaturated carboxylic acid esters are selected from the group consisting of acrylates and methacrylates. In some embodiments, the acrylates and methacrylates have a linear or branched alkyl group with 1 to about 24 carbon atoms. In some embodiments, the acrylate is selected from the group consisting of methyl acrylate, ethyl acrylate, propyl acrylate, n-butyl acrylate, t-butyl acrylate, isobutyl acrylate, pentyl acrylate, isononyl acrylate, hexyl acrylate, 2-methyl-entyl acrylate, octyl acrylate, 2-ethylhexyl acrylate, and dodecyl acrylate. In some embodiments, the methacrylate is selected from the group consisting of methyl methacrylate and ethyl methacrylate; lauryl (meth)acrylate and cyclohexyl (meth)acrylate.

In some embodiments, the comonomers are selected from the group consisting of methyl acrylate (EMA copolymers), ethyl acrylate (EEA copolymers) and butyl acrylate (EBA copolymers). In some embodiments, the comonomer is n-butyl acrylate.

In some embodiments, component (i) of Component B) has a melt flow rate (230° C./2.16 kg) ranging between 50 and 200 g/10 min; alternatively between 80 and 170 g/10 min.

In some embodiments, components (i)+(ii) of Component B) blended together have a melt flow rate (230° C./2.16 kg) between 0.1 and 60 g/10 min. alternatively between 1 and 50 g/10 min; alternatively between 8 and 40 g/10 min.

In some embodiments, component (ii) has a density (determined according to ISO 1183 at 23° C.) of from 0.900 to 0.965 g/cm$^3$. Component ii) is an ethylene copolymer containing $C_3$-$C_8$ alpha-olefin derived units. In some embodiments, the alpha-olefin comonomers are selected from the group consisting of propylene, 1-butene, 1-pentene, 4-methyl-1-pentene, 1-hexene and 1-octene. In some embodiments, the alpha-olefin comonomers are selected from the group consisting of 1-butene 1-hexene and 1-octene. In some embodiments, the alpha-olefin comonomer is 1-butene.

In some embodiments, the second polyolefin composition Component B) has a melt flow rate (230° C./2.16 kg) between 0.1 and 6.0 g/10 min; alternatively between 0.5 and 5.5 g/10 min; alternatively between 1.0 and 5.0 g/10 min.

In some embodiments, the second polyolefin composition Component B) has an intrinsic viscosity [η] (measured in tetrahydronaphthalene at 135° C.) of the xylene soluble fraction at 25° C. between 1.0 to 4.0 dl/g, alternatively the intrinsic viscosity is between 1.5 and 3.5 dl/g; alternatively the intrinsic viscosity is between 2.0 and 3.0 dl/g.

As used herein, the term "copolymer" refers to polymers containing two kinds of comonomers such as propylene and ethylene or ethylene and 1-butene.

In some embodiments, the multilayer film is a three layer ABA film wherein layer B is made from or contains the first polyolefin composition. In some embodiments, layer A is made by polymer used for stretch hood blown film. In some embodiments, the polymer is selected from the group consisting of LLDPE, LLDPE/LDPE blend, and the first composition. In some embodiments, the LLDPE resin is obtained by using metallocene based catalyst. In some embodiments, the LLDPE resin is Exxon Mobil Exceed™ 1018 KB.

In some embodiments, the multilayer blown film for stretch hood has a thickness ranging from 30 to 200 micron; alternatively from 50 to 150 micron.

In some embodiments, the second polyolefin composition B) is prepared by a sequential polymerization, including three sequential steps, wherein components (i), (ii) and (iii) are prepared in separate subsequent steps, operating in each step, except the first step, in the presence of the polymer formed and the catalyst used in the preceding step. The catalyst is added in the first step. In some embodiments, the catalyst's activity is such that the catalyst is still active for the subsequent steps.

In some embodiments, the polymerization is selected from continuous or batch processes. In some embodiments, the polymerization is carried out in a process operating in liquid phase. In some embodiments, the polymerization is carried out in the presence inert diluent. In some embodiments, the polymerization is carried out in the absence of inert diluent. In some embodiments, the polymerization is carried out in a process operating in gas phase. In some embodiments, the polymerization is carried out in a process operating with mixed liquid-gas techniques.

In some embodiments, reaction time, pressure and temperature relative to the polymerization steps are not critical. In some embodiments, the reaction temperature is from 50 to 100° C. In some embodiments, the reaction pressure is atmospheric or higher.

In some embodiments, the regulation of the molecular weight is carried out by using regulators. In some embodiments, the regulator is hydrogen.

In some embodiments, the polymerizations are carried out in the presence of a Ziegler-Nana catalyst. In some embodiments, the Ziegler-Natta catalyst is made from or contains the product of the reaction of an organometallic compound of group 1, 2 or 13 of the Periodic Table of elements with a transition metal compound of groups 4 to 10 of the Periodic Table of Elements (new notation). In some embodiments, the transition metal compound is selected from compounds of Ti, V, Zr, Cr and Hf. In some embodiments, the transition metal compound is supported on $MgCl_2$.

In some embodiments, the catalysts are made from or contain the product of the reaction of the organometallic compound of group 1, 2 or 13 of the Periodic Table of elements, with a solid catalyst component made from or containing a Ti compound and an electron donor compound supported on $MgCl_2$.

In some embodiments, the organometallic compounds are aluminum alkyl compounds.

In some embodiments, the second polymer composition B) is obtained by using a Ziegler-Natta polymerization catalyst, alternatively a Ziegler-Natta catalyst supported on $MgCl_2$, alternatively a Ziegler-Natta catalyst made from or containing the product of reaction of:

1) a solid catalyst component made from or containing a Ti compound and an electron donor (internal electron-donor) supported on $MgCl_2$;

2) an aluminum alkyl compound (cocatalyst); and, optionally, 3) an electron-donor compound (external electron-donor).

In some embodiments, the solid catalyst component (1) contains, as an electron-donor, a compound selected among ethers, ketones, lactones, compounds containing N, P and/or S atoms, and mono- and dicarboxylic acid esters.

In some embodiments, the catalysts are selected from the catalysts described in U.S. Pat. No. 4,399,054 and European Patent No. 45977, incorporated herein by reference.

In some embodiments, the electron-donor compounds are selected from the group consisting of phthalic acid esters and succinic acid esters. In some embodiments, the electron-donor is diisobutyl phthalate.

In some embodiments, the succinic acid esters are represented by the formula (I):

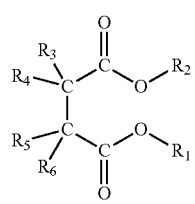

(I)

wherein the radicals $R_1$ and $R_2$, equal to or different from each other, are a $C_1$-$C_{20}$ linear or branched alkyl, alkenyl, cycloalkyl, aryl, arylalkyl or alkylaryl group, optionally containing heteroatoms; the radicals $R_3$ to $R_6$ equal to or different from each other, are hydrogen or a $C_1$-$C_{20}$ linear or branched alkyl, alkenyl, cycloalkyl, aryl, arylalkyl or alkylaryl group, optionally containing heteroatoms, and the radicals $R_3$ to $R_6$ which are joined to the same carbon atom can be linked together to form a cycle.

In some embodiments, $R_1$ and $R_2$ are selected from the group consisting of $C_1$-$C_8$ alkyl, cycloalkyl, aryl, arylalkyl and alkylaryl groups. In some embodiments, $R_1$ and $R_2$ are selected from primary alkyls, alternatively branched primary alkyls. In some embodiments, $R_1$ and $R_2$ groups are selected from the group consisting of methyl, ethyl, n-propyl, n-butyl, isobutyl, neopentyl, and 2-ethylhexyl. In some embodiments, R1 and R2 groups are selected from the group consisting of ethyl, isobutyl, and neopentyl.

In some embodiments, $R_3$ to $R_5$ are hydrogen and $R_6$ is a branched alkyl, cycloalkyl, aryl, arylalkyl and alkylaryl radical having from 3 to 10 carbon atoms. In some embodiments, at least two radicals from $R_3$ to $R_6$ are different from hydrogen and are selected from $C_1$-$C_{20}$ linear or branched alkyl, alkenyl, cycloalkyl, aryl, arylalkyl or alkylaryl group, optionally containing heteroatoms. In some embodiments, the two radicals different from hydrogen are linked to the same carbon atom. In some embodiments, the at least two radicals different from hydrogen are linked to different carbon atoms are (a) $R_3$ and $R_5$ or (b) $R_4$ and $R_6$.

In some embodiments, other electron-donors are the 1,3-diethers as described in published European Patent Application Nos. EP-A-361 493 and 728769, incorporated herein by reference.

In some embodiments, cocatalysts (2) are selected from trialkyl aluminum compounds. In some embodiments, the trialkyl aluminum compounds are selected from the group consisting of Al-triethyl, Al-triisobutyl and Al-tri-n-butyl.

In some embodiments, the electron-donor compounds (3) used as external electron-donors (added to the Al-alkyl compound) are made from or contain aromatic acid esters, heterocyclic compounds, and silicon compounds containing at least one Si—OR bond (where R is a hydrocarbon radical). In some embodiments, the aromatic acid esters are alkylic benzoates. In some embodiments, the heterocyclic compounds are selected from the group consisting of 2,2,6,6-tetramethylpiperidine and 2,6-diisopropylpiperidine.

In some embodiments, the silicon compounds have the formula $R^1_a R^2_b Si(OR^3)_c$, where a and b are integer numbers from 0 to 2, c is an integer from 1 to 3 and the sum (a+b+c) is 4; $R^1$, $R^2$ and $R^3$ are alkyl, cycloalkyl or aryl radicals with 1-18 carbon atoms optionally containing heteroatoms.

In some embodiments, the silicon compounds are selected from the group consisting of (tert-butyl)$_2$Si(OCH$_3$)$_2$, (cyclohexyl)(methyl)Si (OCH$_3$)$_2$, (phenyl)$_2$Si(OCH$_3$)$_2$ and (cyclopentyl)$_2$Si(OCH$_3$)$_2$.

In some embodiments, the 1,3-diethers are used as external donors. In some embodiments, when the internal donor is a 1,3-diether, the external donor is omitted.

In some embodiments, the catalysts are precontacted with small quantities of olefin (prepolymerization), maintaining the catalyst in suspension in a hydrocarbon solvent, and polymerizing at temperatures from room to 60° C., thus producing a quantity of polymer from 0.5 to 3 times the weight of the catalyst.

In some embodiments, the operation takes place in liquid monomer, producing a quantity of polymer up to 1000 times the weight of the catalyst.

In some embodiments, the second polyolefin composition B) is prepared as a physical blend of the separately-prepared components rather than as a reactor blend.

The following examples are given to illustrate and not limit the present disclosure.

EXAMPLES

Characterizations

Xylene-Soluble Faction at 25° C. (XS or Xs)

The Xylene Soluble fraction was measured according to ISO 16152, 2005, but with the following deviations (between parentheses).

The solution volume was 250 ml (200 ml);

During the precipitation stage at 25° C. for 30 min, the solution, for the final 10 minutes, was kept under agitation by a magnetic stirrer (30 min, without any stirring at all);

The final drying step was done under vacuum at 70° C. (100° C.);

The content of the xylene-soluble fraction was expressed as a percentage of the original 2.5 grams and then, by difference (complementary to 100), the xylene unsoluble %;

XS of components (ii) and (iii) have been calculated by using the formula;

$$XS_{tot}=W_i XS_i + W_{ii} XS_{ii} + W_{iii} XS_{iii}$$

wherein $W_i$, $W_{ii}$ and $W_{iii}$ are the relative amounts of components i, ii and iii (i+ii+iii=1)

Melt Flow Rate

Measured according to ISO 1133 at 230° C. with a load of 2.16 kg, unless otherwise specified.

Intrinsic Viscosity IV

The sample was dissolved in tetrahydronaphthalene at 135° C. and then poured into the capillary viscometer. The viscometer tube (Ubbelohde type) was surrounded by a cylindrical glass jacket; this setup allowed temperature control with a circulating thermostated liquid. The downward passage of the meniscus was timed by a photoelectric device.

The passage of the meniscus in front of the upper lamp started the counter which had a quartz crystal oscillator. The meniscus stopped the counter as the meniscus passed the lower lamp and the efflux time was registered: the efflux time was converted into a value of intrinsic viscosity through Huggins' equation (Huggins, M. L., J. Am. Chem. Soc., 1942, 64, 2716, incorporated herein by reference) using the flow time of the pure solvent at the same experimental conditions (same viscometer and same temperature). A single polymer solution was used to determine [η].

Comonomer (C2 and C4) Content Determined by Using $^{13}$C NMR $^{13}$C NMR spectra of base polymers and their fractions were acquired on a Bruker AV600 spectrometer equipped with cryo probe, operating 150.91 MHz MHz in the Fourier transform mode at 120° C. The peak of the Sδδ carbon (nomenclature according C. J. Carman, R. A. Harrington and C. E. Wilkes, Macromolecules, 10, 3, 536 (1977), incorporated herein by reference) was used as internal reference at 29.7 ppm. About 30 mg of sample were dissolved in 0.5 ml of 1,1,2,2 tetrachloro ethane d2 at 120° C. Each spectrum was acquired with a 90° pulse, 15 seconds of delay between pulses and CPD to remove 1H-$^{13}$C coupling. 512 transients were stored in 65 K data points using a spectral window of 9000 Hz. The assignments of the spectra were made according to [M. Kakugo, Y. Naito, K. Mizunuma and T. Miyatake, Macromolecules, 16, 4, 1160 (2082)] and [E. T. Hsieh, J. C. Randall, Macromolecules, 15, 353-360 (1982)], both incorporated herein by reference.

Triad distribution was obtained using the following relations:

PPP=100$I_{10}$/Σ

PPE=100$I_6$/Σ EPE=100$I_5$/Σ

BBB=100$I_3$/Σ

BBE=100$I_2$/Σ

EBE=100$I_{11}$/Σ

XEX=100$I_{12}$/Σ

XEE=100($I_1$+$I_4$)/Σ

EEE=100(0.5$I_9$+0.25($I_7$+$I_8$))/Σ wherein

Σ=$I_1$+$I_2$+$I_3$+$I_4$+$I_5$+$I_6$+0.25$I_7$+0.25$I_8$+0.5$I_9$+$I_{10}$+$I_{11}$+$I_{12}$ and wherein X can be propylene (P) or 1-butene (B), and $I_1$ to $I_{12}$ are the areas of the corresponding carbon atoms as reported below (selected triads and assignments reported):

| Number | Chemical Shift (ppm) | Carbon | Sequence |
| --- | --- | --- | --- |
| $I_1$ | 37.64-37.35 | $S_{\alpha\delta}$ | PEE |
| $I_2$ | 37.35-37.15 | $T_{\beta\delta}$ | BBE |
| $I_3$ | 35.27-34.92 | $T_{\beta\beta}$ | BBB |
| $I_4$ | 34.39-33.80 | $S_{\alpha\delta}$ | BEE |
| $I_5$ | 33.13 | $T_{\delta\delta}$ | EPE |
| $I_6$ | 30.93-30.77 | $T_{\beta\delta}$ | PPE |
| $I_7$ | 30.39 | $S_{\gamma\delta}$ | BEEE |
| $I_8$ | 30.29 | $S_{\gamma\delta}$ | PEEE |
| $I_9$ | 29.97 | $S_{\delta\delta}$ | EEE |
| $I_{10}$ | 29.14-28.31 | $T_{\beta\beta}$ | PPP |
| $I_{11}$ | 26.70-26.55 | $2B_2$ | EBE |
| $I_{12}$ | 24.88-24.14 | $S_{\beta\beta}$ | XEX |

The molar content of ethylene (E), of propylene (P) and of 1-butene (B) is obtained from triads using the following relations:

E (m %)=EEE+XEE+XEX

P (m %)=PPP+PPE+EPE

B (m %)=BBB+BBE+EBE

Elmendorf Tear Resistance on Film is Measured Using the ASTM D1922

Stress Retention Test

Stress retention test was carried out according to ASTM D5459-95 reapproved 2012 with an extension of 100% and 60 seconds of relaxation.

Examples 1—Preparation of Second Polyolefin Composition Component B

Catalyst Precursor

The solid catalyst component used in polymerization was a Ziegler-Natta catalyst component supported on magnesium chloride, containing titanium and diisobutylphthalate as internal donor. An initial amount of microspheroidal MgCl2.2.8C2H5OH was prepared according to the method described in Example 2 of U.S. Pat. No. 4,399,054, incorporated herein by reference, but operating at 3,000 rpm instead of 10,000. The adduct was subjected to thermal dealcoholation at increasing temperatures from 30 to 130° C., operating in nitrogen current until the molar alcohol content per mol of Mg was 1.16. Into a 1000 mL four-necked round flask, purged with nitrogen, 500 mL of TiCl4 were introduced at 0° C. While stirring, 30 grams of the microspheroidal MgCl2.1.16C2H5OH adduct were added. The temperature was raised to 120° C. and kept for 60 minutes. During the temperature increase, an amount of diisobutylphthalate was added such as to have a Mg/diisobutylphthalate molar ratio of 18. After the 60 minutes, the stirring was stopped, the liquid was siphoned off and the treatment with TiCl4 was repeated at 100° C. for 1 hour in the presence of an amount of diisobutylphthalate such as to have a Mg/diisobutylphthalate molar ratio of 27. After that time the stirring was stopped, the liquid was siphoned off, and the treatment with TiCl4 was repeated at 100° C. for 30 min. After sedimentation and siphoning at 85° C., the solid was washed six times with anhydrous hexane (6×100 ml) at 60° C.

Catalyst System and Prepolymerization

Before introducing the solid catalyst component into the polymerization reactors, the solid catalyst component was contacted at 30° C. for 9 minutes with aluminum triethyl (TEAL) and dicyclopentyldimethoxysilane (DCPMS), in a TEAL/DCPMS weight ratio equal to about 15 and in such quantity that the TEAL/solid catalyst component weight ratio be equal to 4.

The catalyst system was subjected to prepolymerization by maintaining the catalyst system in suspension in liquid propylene at 50° C. for about 75 minutes before introducing the catalyst system into the first polymerization reactor.

Polymerization

The polymerization was carried out in a continuous series of three gas-phase reactors equipped with devices to transfer the product from the first reactor to the second one. Into the first gas phase polymerization reactor, a propylene-based polymer (i) is produced by feeding in a continuous and constant flow the prepolymerized catalyst system, hydrogen (used as molecular weight regulator) and propylene, in a gas state. The propylene-based polymer (i) coming from the first reactor was discharged in a continuous flow and, after having been purged of unreacted monomers, was introduced, in a continuous flow, into the second gas phase reactor, together with quantitatively constant flows of hydrogen and ethylene, in a gas state. In the second reactor a copolymer of ethylene (ii) was produced. The product coming from the second reactor was discharged in a continuous flow and, after having been purged of unreacted monomers, was introduced, in a continuous flow, into the third gas phase reactor, together with quantitatively constant flows of hydrogen, ethylene and propylene in a gas state. In the third reactor an ethylene-propylene polymer (iii) was produced. Polymerization conditions, molar ratio of the reactants and composition of the copolymers obtained are shown in Table 1. The polymer particles exiting the third reactor were subjected to a steam treatment to remove the reactive monomers and volatile substances, and then dried. Thereafter the polymer particles were mixed with a stabilizing additive composition in a twin screw extruder Berstorff ZE 25 (length/diameter ratio of screws: 34) and extruded under nitrogen atmosphere in the following conditions:

Rotation speed: 250 rpm;
Extruder output: 15 kg/hour;
Melt temperature: 245° C.

The stabilizing additive composition was made of the following components:

–0.1% by weight of Irganox® 1010;
–0.1% by weight of Irgafos® 168;
–0.04% by weight of DHT-4A (hydrotalcite);

the percent amounts being referred to the total weight of the polymer and stabilizing additive composition.

The Irganox® 1010 was 2,2-bis[3-[,5-bis(1,1-dimethylethyl)-4-hydroxyphenyl)-1-oxopropoxy]methyl]-1,3-propanediyl-3,5-bis(1,1-dimethylethyl)-4-hydroxybenzenepropanoate, while Irgafos® 168 was tris(2,4-di-tert.-butylphenyl)phosphite. The characteristics relating to the polymer composition, reported in Table 2, were obtained from measurements carried out on the extruded polymer, which constituted the stabilized ethylene polymer composition.

TABLE 1

| Polymerization conditions | | |
|---|---|---|
| Example | | 1 |
| 1st Reactor - component (i) | | |
| Temperature | ° C. | 60 |
| Pressure | barg | 16 |
| $H_2/C_3$- | mol. | 0.24 |
| Split | wt % | 22 |
| Xylene soluble of (i) ($XS_i$) | wt % | 4.2 |
| MFR of (i) | g/10 min. | 110 |
| 2nd Reactor - component (ii) | | |
| Temperature | ° C. | 80 |
| Pressure | barg | 18 |

TABLE 1-continued

| Polymerization conditions | | |
|---|---|---|
| Example | | 1 |
| $H_2/C_2$- | mol. | 0.81 |
| $C_4$-/($C_2$- + $C_4$-) | mol. | 0.25 |
| $C_2$-/($C_2$- + $C_3$-) | mol. | 0.98 |
| Split | wt % | 32 |
| $C_2$- content of i * | wt % | 90 |
| $C_4$- content of i * | wt % | 10 |
| Xylene soluble of i ($XS_i$) * | wt % | 16.0 |
| Xylene soluble of (i + ii) | wt % | 12.0 |
| MFR of (i + ii) | g/10 min. | 35.9 |
| 3rd Reactor - component (iii) | | |
| Temperature | ° C. | 65 |
| Pressure | barg | 18 |
| $H_2/C_2$- | mol. | 0.17 |
| $C_2$-/($C_2$- + $C_3$-) | mol. | 0.42 |
| Split | wt % | 46 |
| $C_2$- content of iii * | wt % | 52 |
| Xylene soluble of (iii) ($XS_{iii}$) * | wt % | 83 |

C2- = ethylene; C3- = propylene; C4- = 1-butene (IR); split = amount of polymer produced in the concerned reactor.
* Calculated values

TABLE 2

| properties of component B | | |
|---|---|---|
| Example | | 1 |
| component i | | |
| C2 content | wt % | 0 |
| XSi | wt % | 4.2 |
| MFR | g/10 min | 110 |
| split | wt % | 22 |
| component ii | | |
| XSi* | wt % | 16 |
| C2 content* | wt % | 90.0 |
| C4 content* | wt % | 10.0 |
| split | wt % | 32 |
| MFR i + ii | g/10 min | 35.9 |
| Component iii | | |
| XSi* | wt % | 83 |
| C2 content* | wt % | 52 |
| split | wt % | 446 |
| total composition | | |
| MFR | g/10 min | 1.61 |
| IV on soluble in Xylene | dl/g | 2.4 |

Component A) was a commercial low density ethylene/n-butyl acrylate copolymer sold by LyondellBasell under the tradename Lucalen A2540D. The ethylene copolymer had a density of 0.923 g/cm$^3$; MFR (190° C./2.16 kg) of 0.25 g/10 min and a nominal nBA (n-butyl acrylate) content of 6.5% wt.

The polymer used in comparative example 1 was an ethylene vinyl acetate copolymer, EVA, sold by Versalis under the tradename Greenflex FC 45 F. The polymer had a Melt Flow Rate (190° C./2.16 kg) of 0.3 g/10 min; density 0.935 g/cm$^3$ and a vinyl acetate content of 14 wt %.

Layer A of the stretch hood film was made with LLDPE ExxonMobil Exceed 1018 KB. An LLDPE polymer obtained with metallocene-based catalyst.

Stretch Hood Film.

A three-layer ABA 100-micron thick stretch hood film was produced. Layer A was 20 microns thick made of LLDE ExxonMobil Exceed 1018 KB. In example 1 layer B was made by using a blend of 50 wt % of Lucalen A2540D and 50 wt % of the composition obtained in example 1. In comparative example 2 layer B was made by using Greenflex FC 45 F. Both B layers were 60 microns thick. The results of the analysis are reported in Table 2.

TABLE 2

| stretch hood film | | example 1 | comparative 2 |
|---|---|---|---|
| layer A | | | |
| thick | □ | 20 | 20 |
| Exceed 1018KB | wt % | 100 | 100 |
| layer B | | | |
| thick | □ | 60 | 60 |
| Greenflex FC 45 F | wt % | 0 | 100 |
| Lucalen A2540D | wt % | 50 | 0 |
| composition 1 | wt % | 50 | 0 |
| property of film | | | |
| dart test | g | >1450 | >1450 |
| ELMENDORF TD | gf | 1305 | 1174 |
| Stress Retention after 180 sec | MPa | 3.62 | 3.68 |

What is claimed is:

1. A multilayer blown film for stretch hood comprising:
a layer comprising
a first polyolefin composition comprising:
from 20 wt % to 80 wt %, based upon the total weight of the first polyolefin composition,-of Component A) and
from 20 wt % to 80 wt %, based upon the total weight of the first polyolefin composition, of Component B);
wherein the amounts of A) and B)-being referred to the total weight of A)+B) and the sum of the amount of A) and B) being 100; and
wherein
Component A) is an ethylene copolymer-comprising a recurring unit derived from an ester selected from:
(1) ethylenically unsaturated organic monomer of esters of unsaturated $C_3$-C20 monocarboxylic acids and $C_1$ to $C_{24}$ monovalent aliphatic or alicyclic alcohols, and
(2) vinyl esters of saturated $C_2$-$C_{18}$ carboxylic acids;
wherein the ethylene copolymer-having a density ranging from 0.920 to 0.935 g/mL; and an MFR at 190° C./2.16 kg ranging from 0.10 to 20.00 g/10 min; and
Component B) is a second polyolefin composition comprising
(i) 5-35% by weight, based upon the total weight of Component B, of a propylene homopolymer containing 5% by weight or less of a fraction soluble in xylene at 25° C. ($XS_i$), or a propylene ethylene copolymer containing 90% by weight or more of propylene units; containing 10% by weight or less of a fraction soluble in xylene at 25° C. ($XS_i$), both the amount of propylene units and of the fraction $XS_i$ being referred to the weight of (i);
(ii) 20-50% by weight, based upon the total weight of Component B, of a copolymer of ethylene and a $C_3$-$C_8$ alpha-olefin containing from 0.1% to 20% by weight of alpha-olefin units and containing 25% by weight or less; of a fraction soluble in xylene at 25° C. ($XS_{ii}$), both the amount of alpha-olefin units and of the fraction $XS_{ii}$ being referred to the weight of (ii); and (iii) 30-60% by weight, based upon the total weight of Component B, of a copolymer of ethylene and propylene containing from 25% to 75% by weight; of ethylene units and containing from 40% to 95% by weight of a fraction soluble in xylene at 25° C. ($XS_{iii}$), both the amount of ethylene units and of the fraction $XS_{iii}$ being referred to the weight of (iii),
wherein the amounts of (i), (ii) and (iii) being referred to the total weight of (i)+(ii)+(iii) and the sum of the amount of (i), (ii) and (iii) being 100.

2. The multilayer blown film for stretch hood according to claim 1, wherein, in Component B), component i) is a propylene homopolymer.

3. The multilayer blown film for stretch hood according to claim 1, wherein Component A) ranges from 60 wt % to 40 wt % and Component B) ranges from 40 wt % to 60 wt %.

4. The multilayer blown film for stretch hood according to claim 1, wherein, in Component B), component i) ranges from 10% to 30% by weight; component ii) ranges from 25% to 45% by weight; and component iii) ranges from 35% to 55% by weight.

5. The multilayer blown film for stretch hood according to claim 1, wherein, in Component B), component (i)-has a melt flow rate at 230° C./2.16 kg ranging-between 50 and 200 g/10 min.

6. The multilayer blown film for stretch hood according to claim 1, wherein, in Component B),-components (i)+(ii) blended together have a melt flow rate at 230° C./2.16 kg between 0.1 and 60 g/10 min.

7. The multilayer blown film for stretch hood according to claim 1, wherein the second polyolefin composition Component B)-has a melt flow rate at 230° C./2.16 kg between 0.1 and 6.0 g/10 min.

8. The multilayer blown film for stretch hood according to claim 1, wherein the-second polyolefin composition Component B)-has an intrinsic viscosity [η], measured in tetrahydronaphthalene at 135° C., of the xylene soluble fraction at 25° C. between 1.0 to 4.0 dl/g.

9. The multilayer blown film for stretch hood according to claim 1, wherein the film is a three layer ABA film wherein layer B comprises the first polyolefin composition.

10. The multilayer blown film for stretch hood according to claim 1, wherein the film is a three layer ABA film wherein layer A comprises-LLDPE copolymers-or LLDPE/LDPE blend.

11. The multilayer blown film for stretch hood according to claim 1, wherein the film has a thickness ranging from 30 to 200 micron.

12. The multilayer blown film for stretch hood according to claim 1, wherein, in Component B) component ii) is a copolymer of ethylene and an alpha-olefin comonomer selected from the group consisting of 1-butene, 1-hexene and 1-octene.

13. The multilayer blown film for stretch hood according to claim 1, wherein, in Component B), component ii) is a copolymer of ethylene and a -$C_3$-$C_8$ alpha-olefin containing from 5% to 15% by weight of alpha-olefin units.

14. The multilayer blown film for stretch hood according to claim 1, wherein, in Component B), component iii) is a copolymer of ethylene and propylene containing from 37% to 65% by weight of ethylene units.

15. The multilayer blown film for stretch hood according to claim 1, wherein component A) has an MFR at 190° C./2.16 kg ranging from 0.15 to 10.00 g/10 min.

* * * * *